US012589512B2

(12) United States Patent
Zhu et al.

(10) Patent No.: US 12,589,512 B2
(45) Date of Patent: Mar. 31, 2026

(54) SHEARING TOOL WITH CLOSURE ASSIST

(71) Applicant: Toyota Motor Engineering & Manufacturing North America, Inc., Plano, TX (US)

(72) Inventors: Yufei Zhu, Ypsilanti, MI (US); Brian J. Pinkelman, Ann Arbor, MI (US); Michael Paul Rowe, Pinckney, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 148 days.

(21) Appl. No.: 18/399,075

(22) Filed: Dec. 28, 2023

(65) Prior Publication Data

US 2025/0214265 A1 Jul. 3, 2025

(51) Int. Cl.
*B26B 15/00* (2006.01)

(52) U.S. Cl.
CPC .................................... *B26B 15/00* (2013.01)

(58) Field of Classification Search
CPC ......... B26B 13/16; B26B 13/00; B26B 15/00; B26B 15/13; A01G 3/037; F03G 7/0614
See application file for complete search history.

(56) References Cited

U.S. PATENT DOCUMENTS 278,787 A 6/1883 Fannin
1,658,669 A 2/1928 Cohn et al.
1,741,109 A * 12/1929 Heimerdinger ......... B26B 13/16 30/271
1,802,904 A * 4/1931 Bryant .................... B26B 13/16 81/321
2,322,755 A 6/1943 Voorhies
2,327,683 A 8/1943 Warner et al.
2,508,804 A 5/1950 Schwindt
(Continued)

FOREIGN PATENT DOCUMENTS

CN 201037277 3/2008
CN 101367433 A 2/2009
(Continued)

OTHER PUBLICATIONS

Rowe et al., U.S. Appl. No. 18/453,395, filed Aug. 22, 2023.
(Continued)

*Primary Examiner* — Jennifer S Matthews
(74) *Attorney, Agent, or Firm* — Christopher G. Darrow; Darrow Mustafa PC

(57) ABSTRACT

A shearing tool can be configured to provide closure assistance. The shearing tool can include a first portion and a second portion pivotably connected to each other. The first portion can include a handle portion and a working portion. The second portion can include a handle portion and a working portion. The shearing tool can include a contracting member operatively connected to the first portion and the second portion. When activated, the contracting member can contract such that shearing tool moves from an open configuration toward a closed configuration. As a result, assistance in closing the shearing tool can be provided by the contracting member.

9 Claims, 4 Drawing Sheets

(56) References Cited

U.S. PATENT DOCUMENTS

| | | | |
|---|---|---|---|
| 2,588,706 A | 3/1952 | Davis | |
| 3,394,631 A | 7/1968 | Thompson | |
| 3,706,102 A | 12/1972 | Grenier | |
| 4,063,826 A | 12/1977 | Riepe | |
| 4,244,140 A | 1/1981 | Kim | |
| 4,275,561 A | 6/1981 | Wang | |
| 4,396,220 A | 8/1983 | Dieckmann et al. | |
| 4,498,851 A | 2/1985 | Kolm et al. | |
| 4,522,447 A | 6/1985 | Snyder et al. | |
| 4,541,885 A | 9/1985 | Caudill, Jr. | |
| 4,544,988 A | 10/1985 | Hochstein | |
| 4,553,393 A | 11/1985 | Ruoff | |
| 4,595,338 A | 6/1986 | Kolm et al. | |
| 4,779,852 A | 10/1988 | Wassell | |
| 4,780,062 A | 10/1988 | Yamada et al. | |
| 4,806,815 A | 2/1989 | Homma | |
| 4,811,564 A | 3/1989 | Palmer | |
| 4,834,619 A | 5/1989 | Walton | |
| 4,898,426 A | 2/1990 | Schulz et al. | |
| 4,923,000 A | 5/1990 | Nelson | |
| 4,944,755 A | 7/1990 | Hennequin et al. | |
| 4,955,196 A | 9/1990 | Lin et al. | |
| 4,964,402 A | 10/1990 | Grim et al. | |
| 5,069,219 A | 12/1991 | Knoblich | |
| 5,088,115 A | 2/1992 | Napolitano | |
| 5,127,228 A | 7/1992 | Swenson | |
| 5,129,753 A | 7/1992 | Wesley et al. | |
| 5,250,167 A | 10/1993 | Adolf et al. | |
| 5,255,390 A | 10/1993 | Gross et al. | |
| 5,279,123 A | 1/1994 | Wechsler et al. | |
| 5,482,351 A | 1/1996 | Young et al. | |
| 5,488,255 A | 1/1996 | Sato et al. | |
| 5,509,923 A * | 4/1996 | Middleman | A61B 17/0218 606/170 |
| 5,522,712 A | 6/1996 | Winn | |
| 5,583,844 A | 12/1996 | Wolf et al. | |
| 5,619,177 A | 4/1997 | Johnson et al. | |
| 5,622,482 A | 4/1997 | Lee | |
| 5,662,376 A | 9/1997 | Breuer et al. | |
| 5,678,247 A | 10/1997 | Vickers | |
| 5,686,003 A | 11/1997 | Ingram et al. | |
| 5,747,140 A | 5/1998 | Heerklotz | |
| 5,771,742 A | 6/1998 | Bokaie et al. | |
| 5,846,629 A | 12/1998 | Gwinn | |
| 5,853,005 A | 12/1998 | Scanlon | |
| 5,861,703 A | 1/1999 | Losinski | |
| 6,043,978 A | 3/2000 | Mody et al. | |
| 6,053,553 A | 4/2000 | Hespelt | |
| 6,093,910 A | 7/2000 | McClintock et al. | |
| 6,116,257 A | 9/2000 | Yokota et al. | |
| 6,142,563 A | 11/2000 | Townsend et al. | |
| 6,155,716 A | 12/2000 | Okamura | |
| 6,186,047 B1 | 2/2001 | Baruffaldi | |
| 6,227,515 B1 | 5/2001 | Broyles | |
| 6,326,707 B1 | 12/2001 | Gummin et al. | |
| 6,379,393 B1 | 4/2002 | Mavroidis et al. | |
| 6,394,001 B1 | 5/2002 | Giesey et al. | |
| 6,404,098 B1 | 6/2002 | Kayama et al. | |
| 6,422,010 B1 | 7/2002 | Julien | |
| 6,443,524 B1 | 9/2002 | Yu | |
| 6,450,725 B1 | 9/2002 | Roth et al. | |
| 6,481,799 B1 | 11/2002 | Whalen | |
| 6,508,437 B1 | 1/2003 | Davis et al. | |
| 6,530,217 B1 | 3/2003 | Yokota et al. | |
| 6,546,806 B1 | 4/2003 | Varma | |
| 6,591,188 B1 | 7/2003 | Ohler | |
| 6,628,522 B2 | 9/2003 | Trautman et al. | |
| 6,664,718 B2 | 12/2003 | Perline et al. | |
| 6,719,694 B2 | 4/2004 | Weng et al. | |
| 6,740,994 B2 | 5/2004 | Lee et al. | |
| 6,773,535 B1 | 8/2004 | Wetzel | |
| 6,809,462 B2 | 10/2004 | Pelrine et al. | |
| 6,896,324 B1 | 5/2005 | Kull et al. | |
| 6,910,714 B2 | 6/2005 | Browne et al. | |
| 6,912,748 B2 | 7/2005 | VanSickle | |
| 6,943,653 B2 | 9/2005 | Hanke et al. | |
| 6,972,659 B2 | 12/2005 | von Behrens et al. | |
| 6,998,546 B1 | 2/2006 | Schmidt et al. | |
| 7,017,345 B2 | 3/2006 | Von Behrens et al. | |
| 7,086,322 B2 | 8/2006 | Schulz | |
| 7,093,903 B2 | 8/2006 | O'Connor et al. | |
| 7,100,990 B2 | 9/2006 | Kimura et al. | |
| 7,108,316 B2 | 9/2006 | Barvosa-Carter et al. | |
| 7,117,673 B2 | 10/2006 | Szilagyi | |
| 7,125,077 B2 | 10/2006 | Frank | |
| 7,204,472 B2 | 4/2007 | Jones et al. | |
| 7,237,847 B2 | 7/2007 | Hancock et al. | |
| 7,256,518 B2 | 8/2007 | Gummin | |
| 7,293,836 B2 | 11/2007 | Browne et al. | |
| 7,306,187 B2 | 12/2007 | Lavan | |
| 7,309,104 B2 | 12/2007 | Browne et al. | |
| 7,331,616 B2 | 2/2008 | Brei et al. | |
| 7,336,486 B2 | 2/2008 | Mongia | |
| 7,350,851 B2 | 4/2008 | Barvosa-Carter et al. | |
| 7,364,211 B2 | 4/2008 | Niskanen et al. | |
| 7,371,052 B2 | 5/2008 | Koeneman | |
| 7,446,450 B2 | 11/2008 | Boland et al. | |
| 7,448,678 B2 | 11/2008 | Browne et al. | |
| 7,476,224 B2 | 1/2009 | Petrakis | |
| 7,478,845 B2 | 1/2009 | Mankame et al. | |
| 7,484,735 B2 | 2/2009 | Verbrugge et al. | |
| 7,501,607 B2 | 3/2009 | Camm et al. | |
| 7,506,937 B2 | 3/2009 | Bequet | |
| 7,511,402 B2 | 3/2009 | Ito et al. | |
| 7,527,312 B1 | 5/2009 | Cucknell et al. | |
| 7,556,313 B2 | 7/2009 | Browne et al. | |
| 7,578,661 B2 | 8/2009 | Koeneman | |
| 7,594,697 B2 | 9/2009 | Browne et al. | |
| 7,619,894 B2 | 11/2009 | Wang et al. | |
| 7,661,764 B2 | 2/2010 | Ali et al. | |
| 7,669,799 B2 | 3/2010 | Elzey | |
| 7,709,995 B2 | 5/2010 | Hanlon et al. | |
| 7,717,520 B2 | 5/2010 | Boren et al. | |
| 7,729,828 B2 | 6/2010 | Gandhi | |
| 7,731,279 B2 | 6/2010 | Asada et al. | |
| 7,735,940 B2 | 6/2010 | Chiu | |
| 7,756,246 B2 | 7/2010 | Mikami et al. | |
| 7,758,121 B2 | 7/2010 | Browne et al. | |
| 7,766,423 B2 | 8/2010 | Alexander et al. | |
| 7,770,391 B2 | 8/2010 | Melz | |
| 7,814,810 B2 | 10/2010 | Mitteer | |
| 7,823,382 B2 | 11/2010 | Ukpai et al. | |
| 7,823,972 B2 | 11/2010 | Browne et al. | |
| 7,834,527 B2 | 11/2010 | Rivera et al. | |
| 7,878,459 B2 | 2/2011 | Mabe et al. | |
| 7,883,148 B2 | 2/2011 | Alexander et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 7,905,547 B2 | 3/2011 | Lawall et al. | |
| 7,909,403 B2 | 3/2011 | Lawall et al. | |
| 7,964,290 B2 | 6/2011 | Mullner et al. | |
| 7,965,509 B2 | 6/2011 | Campbell et al. | |
| 7,971,296 B2 | 7/2011 | Jansen | |
| 7,971,939 B2 | 7/2011 | Fujita et al. | |
| 8,016,952 B2 | 9/2011 | Ishida et al. | |
| 8,038,215 B2 | 10/2011 | Di Gusto et al. | |
| 8,052,112 B2 | 11/2011 | Lawall et al. | |
| 8,056,335 B1 | 11/2011 | Brown | |
| 8,100,471 B2 | 1/2012 | Lawall et al. | |
| 8,109,567 B2 | 2/2012 | Alexander et al. | |
| 8,126,615 B2 | 2/2012 | McMillen et al. | |
| 8,172,458 B2 | 5/2012 | Petrakis | |
| 8,240,677 B2 | 8/2012 | Browne et al. | |
| 8,313,108 B2 | 11/2012 | Ac et al. | |
| 8,362,882 B2 | 1/2013 | Heubel et al. | |
| 8,366,057 B2 | 2/2013 | Vos et al. | |
| 8,414,366 B2 | 4/2013 | Browne et al. | |
| 8,446,475 B2 | 5/2013 | Topliss et al. | |
| 8,448,435 B2 | 5/2013 | Gregory et al. | |
| 8,510,924 B2 | 8/2013 | Mankame et al. | |
| 8,584,456 B1 | 11/2013 | McKnight | |
| 8,585,456 B2 | 11/2013 | Canon | |
| 8,593,568 B2 | 11/2013 | Topliss et al. | |

(56) References Cited

U.S. PATENT DOCUMENTS 8,649,242 B2 2/2014 Martin et al.
8,681,496 B2 3/2014 Dede
8,695,334 B2 4/2014 Lewis et al.
8,702,120 B2 4/2014 Kalisz et al.
8,706,305 B2 4/2014 Jiang et al.
8,721,557 B2 5/2014 Chen et al.
8,741,076 B2 6/2014 Gao et al.
8,756,933 B2 6/2014 Topliss et al.
8,793,821 B2 8/2014 Fowkes et al.
8,827,709 B1 9/2014 Gurule et al.
8,830,335 B2 9/2014 Topliss et al.
8,853,916 B2 10/2014 Browne et al.
8,880,141 B2 11/2014 Chen
8,881,347 B2 11/2014 Feinstein
8,894,142 B2 11/2014 Alexander et al.
8,912,709 B2 12/2014 Pollock et al.
8,991,769 B2 3/2015 Gandhi
8,998,320 B2 4/2015 Mankame et al.
9,068,561 B2 6/2015 Gondo
9,086,069 B2 7/2015 Dede
9,140,243 B2 9/2015 Gandhi et al.
9,168,814 B2 10/2015 Gandhi
9,171,686 B2 10/2015 Alacqua et al.
9,180,525 B2 11/2015 Park et al.
9,267,495 B2 2/2016 Kopfer et al.
9,298,207 B2 3/2016 Li
9,347,609 B2 5/2016 Pinto, IV et al.
9,428,088 B1 8/2016 Rajasingham
9,457,813 B2 10/2016 Hoerwick et al.
9,457,887 B2 10/2016 Roe et al.
9,495,875 B2 11/2016 Dowdall et al.
9,512,829 B2 12/2016 Alacqua et al.
9,550,466 B2 1/2017 Gandhi
9,588,020 B2 3/2017 Browne et al.
9,662,197 B2 5/2017 Yun et al.
9,664,182 B2 5/2017 Nicolini et al.
9,664,210 B2 5/2017 Ou et al.
9,684,183 B2 6/2017 Brown et al.
9,696,175 B2 7/2017 Hansen et al.
9,697,708 B2 7/2017 Adrezin et al.
9,714,460 B2 7/2017 Merideth
9,719,534 B2 8/2017 Shevchenko et al.
9,731,828 B2 8/2017 Lichota
9,764,220 B2 9/2017 Keating et al.
9,784,249 B2 10/2017 Li et al.
9,784,590 B2 10/2017 Englehardt et al.
9,827,888 B2 11/2017 Patrick et al.
9,848,814 B2 12/2017 Benson et al.
9,943,437 B2 4/2018 Lowe et al.
9,945,490 B2 4/2018 Dankbaar et al.
9,981,421 B2 5/2018 Macroe et al.
9,994,136 B2 6/2018 Nakada
10,007,263 B1 6/2018 Fields et al.
10,029,618 B2 7/2018 Perez Astudillo et al.
10,059,334 B1 8/2018 Zhu et al.
10,061,350 B2 8/2018 Magi
10,066,829 B2 9/2018 Wong et al.
10,168,782 B1 1/2019 Tchon et al.
10,191,550 B1 1/2019 Nussbaum et al.
10,208,823 B2 2/2019 Kashani
10,299,520 B1 5/2019 Shaffer et al.
10,302,586 B2 5/2019 Sun et al.
10,315,771 B1 6/2019 Rao et al.
10,330,144 B1 6/2019 Alqasimi et al.
10,330,400 B2 6/2019 Dede
10,335,044 B2 7/2019 Banet et al.
10,349,543 B2 7/2019 Sreetharan et al.
10,355,624 B2 7/2019 Majdi et al.
10,371,229 B2 8/2019 Gandhi et al.
10,371,299 B2 8/2019 Leffler
10,377,278 B2 8/2019 Ketels et al.
10,427,634 B2 10/2019 Gandhi et al.
10,434,973 B2 10/2019 Gandhi et al.
10,441,491 B2 10/2019 Wyatt et al.
10,459,475 B2 10/2019 Gandhi et al.
10,479,246 B2 11/2019 Meingast et al.
10,532,672 B1 1/2020 Pinkelman et al.
10,583,757 B2 3/2020 Ketels et al.
10,591,078 B2 3/2020 Oehler et al.
10,647,237 B2 5/2020 Song
10,677,310 B2 6/2020 Gandhi et al.
10,682,931 B2 6/2020 Rowe et al.
10,759,320 B2 9/2020 Mochizuki
10,773,487 B2 9/2020 Frigerio et al.
10,781,800 B2 9/2020 Brown et al.
10,814,514 B2 10/2020 Aihara
10,843,611 B2 11/2020 Caruss et al.
10,933,974 B2 3/2021 Tsuruta et al.
10,960,793 B2 3/2021 Gandhi et al.
10,965,172 B2 3/2021 Dede et al.
10,993,526 B2 5/2021 Vandewall et al.
10,995,779 B2 5/2021 Keplinger et al.
11,048,329 B1 6/2021 Lee et al.
11,091,060 B2 8/2021 Pinkelman et al.
11,125,248 B2 9/2021 Joshi et al.
11,137,045 B2 10/2021 Gandhi et al.
11,180,052 B2 11/2021 Severgnini et al.
11,215,170 B2 1/2022 Zamani et al.
11,241,842 B2 2/2022 Gandhi et al.
11,247,584 B2 2/2022 Breitweg et al.
11,248,592 B1 2/2022 Tsuruta et al.
11,269,891 B2 3/2022 Frank et al.
11,285,844 B2 3/2022 Gandhi et al.
11,353,009 B1 6/2022 Rowe et al.
11,356,255 B1 6/2022 Emelyanov et al.
11,370,330 B2 6/2022 Gandhi et al.
11,372,481 B2 6/2022 Leroy et al.
11,377,007 B2 7/2022 Samain et al.
11,421,664 B1 8/2022 Rowe et al.
11,458,874 B2 10/2022 Nagai et al.
11,460,009 B1 10/2022 Tsuruta et al.
11,460,010 B1 10/2022 Tsuruta et al.
11,467,669 B2 10/2022 Liu et al.
11,472,325 B1 10/2022 Tsuruta et al.
11,486,421 B2 11/2022 Keplinger et al.
11,536,255 B1 12/2022 Rowe
11,541,820 B2 1/2023 Rea et al.
11,542,925 B1 1/2023 Rowe et al.
11,577,471 B2 2/2023 Gandhi et al.
11,585,128 B2 2/2023 Ketels et al.
11,591,076 B2 2/2023 Song et al.
11,592,010 B1 2/2023 Panwar et al.
11,592,037 B1 2/2023 Rowe et al.
11,603,153 B1 3/2023 Trager et al.
11,603,828 B2 3/2023 Gummin et al.
11,624,376 B2 4/2023 Rowe et al.
11,628,898 B1 4/2023 Trager et al.
11,642,083 B2 5/2023 Severgnini et al.
11,649,808 B2 5/2023 Tsuruta et al.
11,668,287 B2 6/2023 Naly et al.
11,680,559 B1 6/2023 Rowe et al.
11,702,015 B2 7/2023 Pinkelman et al.
11,732,735 B2 8/2023 Song et al.
11,750,115 B2 9/2023 Saneyoshi et al.
11,752,901 B2 9/2023 Gandhi et al.
11,795,924 B2 10/2023 Rowe
11,840,161 B2 12/2023 Schmalenberg et al.
11,841,008 B1 12/2023 Panwar et al.
11,885,428 B2 1/2024 Panwar et al.
11,897,379 B2 2/2024 Tsuruta et al.
11,913,436 B2 2/2024 Easton et al.
11,927,206 B2 3/2024 Rowe et al.
2002/0113499 A1 8/2002 Von et al.
2002/0130754 A1 9/2002 Alacqua et al.
2002/0179663 A1 12/2002 Moore et al.
2002/0185932 A1 12/2002 Gummin et al.
2003/0000605 A1 1/2003 Homma
2003/0182041 A1 9/2003 Watson
2004/0035108 A1 2/2004 Szilagyi
2004/0041998 A1 3/2004 Haddad
2004/0104580 A1 6/2004 Spiessl et al.
2004/0118854 A1 6/2004 Kutun
2004/0145230 A1 7/2004 Fujita et al.
2004/0195888 A1 10/2004 Frye

(56) References Cited

U.S. PATENT DOCUMENTS

2004/0256920 A1 12/2004 Gummin et al.
2004/0261411 A1 12/2004 MacGregor
2005/0023086 A1 2/2005 Szilagyi
2005/0066810 A1 3/2005 Schulz
2005/0082897 A1 4/2005 Ropp et al.
2005/0111177 A1 5/2005 Kwitek
2005/0146147 A1 7/2005 Niskanen et al.
2005/0198904 A1 9/2005 Browne et al.
2005/0199455 A1 9/2005 Browne
2005/0199845 A1 9/2005 Jones et al.
2005/0206096 A1 9/2005 Browne et al.
2005/0210874 A1 9/2005 Browne et al.
2005/0211198 A1 9/2005 Froeschle et al.
2005/0227607 A1 10/2005 Stevenson et al.
2005/0253425 A1 11/2005 Asada et al.
2006/0033312 A1 2/2006 Barvosa-Carter et al.
2006/0038643 A1 2/2006 Xu et al.
2006/0038745 A1 2/2006 Naksen et al.
2006/0074325 A1 4/2006 Karo et al.
2006/0201149 A1 9/2006 Biggs et al.
2006/0223637 A1 10/2006 Rosenberg
2006/0226013 A1 10/2006 Decre et al.
2006/0244293 A1 11/2006 Buffa
2006/0265965 A1 11/2006 Butera et al.
2007/0025575 A1 2/2007 Oser et al.
2007/0046074 A1 3/2007 Satta et al.
2007/0063566 A1 3/2007 Browne et al.
2007/0084220 A1 4/2007 Asada et al.
2007/0188004 A1 8/2007 Browne et al.
2007/0205853 A1 9/2007 Taya et al.
2007/0209213 A1* 9/2007 Chorpash ................ B26B 13/16
30/254
2007/0236071 A1 10/2007 Fujita et al.
2007/0246285 A1 10/2007 Browne et al.
2007/0246898 A1 10/2007 Keefe et al.
2007/0246979 A1 10/2007 Browne et al.
2007/0271939 A1 11/2007 Ichigaya
2007/0277877 A1 12/2007 Ghorbal et al.
2008/0006353 A1 1/2008 Elzey et al.
2008/0010912 A1 1/2008 Hanson et al.
2008/0018198 A1 1/2008 Sohn et al.
2008/0085436 A1 4/2008 Langan et al.
2008/0100118 A1 5/2008 Young et al.
2008/0114218 A1 5/2008 Suyama et al.
2008/0219501 A1 9/2008 Matsumoto
2008/0267770 A1 10/2008 Webster et al.
2008/0271559 A1 11/2008 Garscha et al.
2008/0272259 A1 11/2008 Zavattieri et al.
2008/0307786 A1 12/2008 Hafez et al.
2009/0008973 A1 1/2009 Browne
2009/0009656 A1 1/2009 Honda et al.
2009/0030576 A1 1/2009 Periot et al.
2009/0041085 A1 2/2009 Petrakis
2009/0074993 A1 3/2009 Gao et al.
2009/0108607 A1 4/2009 Browne et al.
2009/0115284 A1 5/2009 Liang et al.
2009/0131752 A1 5/2009 Park
2009/0143730 A1 6/2009 De Polo et al.
2009/0173305 A1 7/2009 Alexander et al.
2009/0212158 A1 8/2009 Mabe et al.
2009/0218858 A1 9/2009 Lawall et al.
2009/0224584 A1 9/2009 Lawall et al.
2009/0224587 A1 9/2009 Lawall et al.
2009/0241537 A1 10/2009 Browne et al.
2009/0242285 A1 10/2009 Whetstone, Jr.
2009/0283643 A1 11/2009 Sar et al.
2009/0284059 A1 11/2009 Gupta et al.
2010/0001568 A1 1/2010 Trybus et al.
2010/0027119 A1 2/2010 Kollar et al.
2010/0031525 A1 2/2010 Allezy et al.
2010/0036567 A1 2/2010 Gandhi
2010/0066142 A1 3/2010 Gross et al.
2010/0117663 A1 5/2010 Herrera et al.
2010/0192567 A1 8/2010 Butera
2010/0212312 A1 8/2010 Rudduck
2010/0221124 A1 9/2010 Ikushima et al.
2010/0244505 A1 9/2010 Demick et al.
2010/0275592 A1 11/2010 Topliss et al.
2010/0282902 A1 11/2010 Rajasingham
2010/0287965 A1 11/2010 Bryant
2010/0294476 A1 11/2010 Gomi et al.
2010/0308689 A1 12/2010 Rahman et al.
2010/0326070 A1 12/2010 Hao et al.
2011/0004346 A1 1/2011 Jiang et al.
2011/0017103 A1 1/2011 Lee
2011/0021932 A1 1/2011 Kim et al.
2011/0030380 A1 2/2011 Widdle, Jr. et al.
2011/0038727 A1 2/2011 Vos et al.
2011/0111839 A1 5/2011 Lesley et al.
2011/0120119 A1 5/2011 Alexander et al.
2011/0150669 A1 6/2011 Frayne et al.
2011/0179786 A1 7/2011 Topliss et al.
2011/0179790 A1 7/2011 Pretorius
2011/0217031 A1 9/2011 Eromaki
2011/0300358 A1 12/2011 Blohowiak et al.
2012/0019216 A1 1/2012 Lewis et al.
2012/0049095 A1 3/2012 Yamasaki
2012/0056459 A1 3/2012 Harden
2012/0081337 A1 4/2012 Camp, Jr. et al.
2012/0109025 A1 5/2012 Weinberg et al.
2012/0136126 A1 5/2012 Rousseau
2012/0181896 A1 7/2012 Kornbluh et al.
2012/0232783 A1 9/2012 Calkins et al.
2012/0237309 A1 9/2012 Park et al.
2012/0239183 A1 9/2012 Mankame et al.
2012/0267928 A1 10/2012 Mankame et al.
2012/0276807 A1 11/2012 Cabrera
2012/0292155 A1 11/2012 Gunter
2012/0297763 A1 11/2012 Mankame et al.
2012/0319445 A1 12/2012 Zolno et al.
2013/0005442 A1 1/2013 Erickson et al.
2013/0011806 A1 1/2013 Gao et al.
2013/0043354 A1 2/2013 Shome et al.
2013/0075210 A1 3/2013 Langbein et al.
2013/0098029 A1 4/2013 Pinto, IV et al.
2013/0188313 A1 7/2013 Dede
2013/0205770 A1 8/2013 Browne et al.
2013/0227943 A1 9/2013 Mance et al.
2014/0130491 A1 5/2014 Gandhi et al.
2014/0168894 A1 6/2014 Dede
2014/0196633 A1 7/2014 Shaw
2014/0207333 A1 7/2014 Vandivier et al.
2014/0210240 A1 7/2014 Muck et al.
2014/0217792 A1 8/2014 Meyer
2014/0239677 A1 8/2014 Laib et al.
2014/0250881 A1 9/2014 Yamamoto
2014/0265468 A1 9/2014 Greenhill et al.
2014/0265479 A1 9/2014 Bennett
2014/0277739 A1 9/2014 Kornbluh et al.
2014/0298794 A1 10/2014 Flaschentrager et al.
2014/0314976 A1 10/2014 Niiyama et al.
2014/0316269 A1 10/2014 Zhang et al.
2014/0333088 A1 11/2014 Lang et al.
2014/0338324 A1 11/2014 Jasklowski
2015/0016968 A1 1/2015 Grabowska et al.
2015/0114270 A1 4/2015 Tsuchida
2015/0130220 A1 5/2015 Preisler et al.
2015/0185764 A1 7/2015 Magi
2015/0197173 A1 7/2015 Hulway
2015/0202993 A1 7/2015 Mankame et al.
2015/0274078 A1 10/2015 Alacqua et al.
2015/0289994 A1 10/2015 Engeberg et al.
2015/0290015 A1 10/2015 Elahinia et al.
2015/0331488 A1 11/2015 Grant et al.
2015/0366350 A1 12/2015 DiCenso et al.
2016/0004298 A1 1/2016 Mazed et al.
2016/0032997 A1 2/2016 Seepersad et al.
2016/0061345 A1 3/2016 Jackson, Jr.
2016/0082984 A1 3/2016 Schmidt
2016/0084665 A1 3/2016 Englehardt et al.
2016/0123793 A1 5/2016 Kollich et al.
2016/0169213 A1 6/2016 Calkins et al.
2016/0221475 A1 8/2016 Sugiyama
2016/0246374 A1 8/2016 Carter et al.

(56) References Cited

U.S. PATENT DOCUMENTS

2016/0278459 A1 9/2016 Hilty
2016/0325837 A1 11/2016 Erhel et al.
2016/0339801 A1 11/2016 Pereny et al.
2016/0345088 A1 11/2016 Vilermo et al.
2016/0375459 A1 12/2016 deVilliers et al.
2016/0375835 A1 12/2016 Murray et al.
2017/0116792 A1 4/2017 Jelinek et al.
2017/0121068 A1 5/2017 Foshansky et al.
2017/0123499 A1 5/2017 Eid
2017/0148102 A1 5/2017 Franke et al.
2017/0153707 A1 6/2017 Subramanian et al.
2017/0158104 A1 6/2017 Le et al.
2017/0166222 A1 6/2017 James
2017/0174236 A1 6/2017 Worden et al.
2017/0203432 A1 7/2017 Andrianesis
2017/0240075 A1 8/2017 McCoy et al.
2017/0252260 A1 9/2017 Gummin et al.
2017/0328384 A1 11/2017 Goto et al.
2017/0355288 A1 12/2017 Barbat et al.
2017/0361733 A1 12/2017 Gage
2018/0001113 A1 1/2018 Streeter
2018/0012433 A1 1/2018 Ricci
2018/0036198 A1 2/2018 Mergl et al.
2018/0073491 A1 3/2018 Gissen et al.
2018/0084915 A1 3/2018 Norman et al.
2018/0111511 A1 4/2018 Lota
2018/0115260 A1 4/2018 Chiba et al.
2018/0130347 A1 5/2018 Ricci et al.
2018/0132825 A1 5/2018 Tachibana
2018/0134191 A1 5/2018 Ketels et al.
2018/0141562 A1 5/2018 Singhal
2018/0148007 A1 5/2018 Gage et al.
2018/0149141 A1 5/2018 Cullen et al.
2018/0151035 A1 5/2018 Maalouf et al.
2018/0178808 A1 6/2018 Zhao et al.
2018/0249772 A1 9/2018 Koo et al.
2018/0251234 A1 9/2018 Wang
2018/0264975 A1 9/2018 Bonk et al.
2018/0281621 A1 10/2018 Kaku et al.
2018/0286189 A1 10/2018 Motamedi et al.
2018/0321703 A1 11/2018 Gandhi et al.
2018/0345841 A1 12/2018 Prokhorov et al.
2018/0348759 A1 12/2018 Freeman et al.
2018/0355991 A1 12/2018 Pfahler
2019/0005272 A1 1/2019 Gault et al.
2019/0023161 A1 1/2019 Sullivan et al.
2019/0039525 A1 2/2019 Hu
2019/0041986 A1 2/2019 Rihn et al.
2019/0042857 A1 2/2019 Endo et al.
2019/0059608 A1 2/2019 Yan et al.
2019/0061307 A1 2/2019 Chen et al.
2019/0083022 A1 3/2019 Huang
2019/0135150 A1 5/2019 Gao et al.
2019/0143869 A1 5/2019 Sequi et al.
2019/0154122 A1 5/2019 Lima et al.
2019/0193615 A1 6/2019 Mankame et al.
2019/0197842 A1 6/2019 Long et al.
2019/0232842 A1 8/2019 Boccuccia et al.
2019/0291649 A1 9/2019 Ito
2020/0010001 A1 1/2020 Pinkelman et al.
2020/0015493 A1 1/2020 Ergun et al.
2020/0015593 A1 1/2020 Norman et al.
2020/0032822 A1 1/2020 Keplinger et al.
2020/0079245 A1 3/2020 Rowe et al.
2020/0088175 A1 3/2020 Li et al.
2020/0112269 A1 4/2020 Taghavi et al.
2020/0179168 A1 6/2020 Kelleher et al.
2020/0197250 A1 6/2020 Wyatt et al.
2020/0223325 A1 7/2020 Pinkelman et al.
2020/0226498 A1 7/2020 Jiwani et al.
2020/0238854 A1 7/2020 Gandhi et al.
2020/0247274 A1 8/2020 Gandhi et al.
2020/0276971 A1 9/2020 Takeda et al.
2020/0282878 A1 9/2020 Gandhi et al.
2020/0298732 A1 9/2020 Gandhi et al.
2020/0307416 A1 10/2020 Gandhi et al.
2020/0309102 A1 10/2020 Henderson et al.
2020/0339242 A1 10/2020 Tsuruta et al.
2020/0377036 A1 12/2020 Lee et al.
2020/0378370 A1 12/2020 Kopfer et al.
2021/0038467 A1 2/2021 Van Der Merwe et al.
2021/0095646 A1 4/2021 Blecha et al.
2021/0114553 A1 4/2021 Awtar et al.
2021/0118597 A1 4/2021 Pinkelman et al.
2021/0132396 A1 5/2021 Shin et al.
2021/0153754 A1 5/2021 Ozawa et al.
2021/0161755 A1 6/2021 Le et al.
2021/0162457 A1 6/2021 Eberfors
2021/0221269 A1 7/2021 Baranowski et al.
2021/0236061 A1 8/2021 Severgnini et al.
2021/0237631 A1 8/2021 Muck et al.
2021/0237809 A1 8/2021 Rowe et al.
2021/0265922 A1 8/2021 Nakagawa
2021/0284079 A1 9/2021 Rowe et al.
2021/0312169 A1 10/2021 Pham
2021/0369547 A1 12/2021 Mau et al.
2021/0370499 A1 12/2021 Rowe et al.
2022/0001530 A1 1/2022 Sameoto et al.
2022/0012458 A1 1/2022 Uetabira
2022/0015932 A1 1/2022 Rowe
2022/0015933 A1 1/2022 Rowe
2022/0015971 A1 1/2022 Rowe et al.
2022/0015977 A1 1/2022 Rowe et al.
2022/0017005 A1 1/2022 Rowe et al.
2022/0021314 A1 1/2022 Rowe et al.
2022/0031178 A1 2/2022 Brulet et al.
2022/0063087 A1 3/2022 Rowe
2022/0106941 A1 4/2022 Easton
2022/0119202 A1 4/2022 Morrissey et al.
2022/0154703 A1 5/2022 Shin et al.
2022/0164079 A1 5/2022 Severgnini et al.
2022/0166351 A1 5/2022 Rowe
2022/0176550 A1 6/2022 Rowe
2022/0176551 A1 6/2022 Rowe et al.
2022/0178414 A1 6/2022 Herzog et al.
2022/0196109 A1 6/2022 Gandhi et al.
2022/0196967 A1 6/2022 Dai et al.
2022/0232903 A1 7/2022 Rutledge et al.
2022/0239238 A1 7/2022 Rowe et al.
2022/0242328 A1 8/2022 Pinkelman et al.
2022/0258656 A1 8/2022 Little
2022/0299016 A1 9/2022 Tsuruta et al.
2022/0307485 A1 9/2022 Gummin et al.
2022/0313420 A1 10/2022 Rowe et al.
2022/0314857 A1 10/2022 Tsuruta et al.
2022/0315147 A1 10/2022 Palaniswamy et al.
2022/0316457 A1 10/2022 Rowe et al.
2022/0316458 A1 10/2022 Tsuruta et al.
2022/0321033 A1 10/2022 Rowe et al.
2022/0321034 A1 10/2022 Ebling et al.
2022/0412325 A1 12/2022 Köpfer et al.
2023/0000715 A1 1/2023 Rowe
2023/0001572 A1 1/2023 Rowe et al.
2023/0078040 A1 3/2023 Rowe et al.
2023/0088911 A1 3/2023 Song et al.
2023/0119407 A1 4/2023 Sugiyama et al.
2023/0120436 A1 4/2023 Tsuruta et al.
2023/0124526 A1 4/2023 Tsuruta et al.
2023/0136197 A1 5/2023 Gilmore et al.
2023/0179122 A1 6/2023 Palaniswamy et al.
2023/0191953 A1 6/2023 Panwar et al.
2023/0193929 A1 6/2023 Rowe et al.
2023/0287871 A1 9/2023 Rowe
2023/0312109 A1 10/2023 Joshi et al.
2023/0331371 A1 10/2023 Gupta et al.
2023/0331372 A1 10/2023 Gupta et al.
2023/0337827 A1 10/2023 Pinkelman et al.
2024/0060480 A1 2/2024 Panwar et al.
2024/0097666 A1 3/2024 Easton et al.

FOREIGN PATENT DOCUMENTS

CN 101417152 A 4/2009
CN 102333504 A 1/2012

(56) References Cited

FOREIGN PATENT DOCUMENTS

| | | | | | |
|---|---|---|---|---|---|
| CN | 102152309 | B | | 11/2012 | |
| CN | 103038094 | A | | 4/2013 | |
| CN | 103147511 | A | | 6/2013 | |
| CN | 102026842 | B | | 7/2013 | |
| CN | 103935495 | A | | 7/2014 | |
| CN | 102765354 | B | | 11/2014 | |
| CN | 104290617 | A | | 1/2015 | |
| CN | 204774820 | U | | 11/2015 | |
| CN | 105517664 | A | | 4/2016 | |
| CN | 106168523 | A | | 11/2016 | |
| CN | 107111473 | A | | 1/2017 | |
| CN | 206029888 | U | | 3/2017 | |
| CN | 106956254 | A | | 7/2017 | |
| CN | 105946515 | B | | 4/2018 | |
| CN | 108100228 | A | | 6/2018 | |
| CN | 108819806 | A | | 11/2018 | |
| CN | 106014897 | B | | 12/2018 | |
| CN | 106956254 | B | | 3/2019 | |
| CN | 109572966 | A | | 4/2019 | |
| CN | 209010975 | U | | 6/2019 | |
| CN | 105003405 | B | | 7/2019 | |
| CN | 107485536 | B | | 1/2020 | |
| CN | 112411375 | A | | 2/2021 | |
| CN | 113119155 | A | | 7/2021 | |
| CN | 115706489 | A | | 2/2023 | |
| DE | 19837829 | A1 | * | 2/2000 | ............ B26B 13/24 |
| DE | 10155119 | B4 | | 5/2003 | |
| DE | 20309196 | U1 | | 11/2003 | |
| DE | 10222022 | A1 | | 12/2003 | |
| DE | 102010021902 | A1 | | 12/2011 | |
| DE | 102016210214 | A1 | | 12/2017 | |
| DE | 102019204866 | A1 | | 10/2020 | |
| DE | 102008021679 | B4 | | 1/2021 | |
| EP | 1420094 | A1 | | 5/2004 | |
| EP | 1519055 | A2 | | 3/2005 | |
| EP | 1904337 | B1 | | 10/2010 | |
| EP | 2723069 | A1 | | 4/2014 | |
| EP | 3196484 | A1 | | 7/2017 | |
| EP | 3858562 | A1 | * | 8/2021 | ............ A01G 3/037 |
| FR | 3058108 | A1 | | 5/2018 | |
| JP | S5870892 | U | | 5/1983 | |
| JP | S61277898 | A | | 12/1986 | |
| JP | H03276698 | A | | 12/1991 | |
| JP | H06033895 | A | | 6/1994 | |
| JP | 09-133069 | A | | 5/1997 | |
| JP | H09168285 | A | | 6/1997 | |
| JP | H10337061 | A | | 12/1998 | |
| JP | 2001293267 | A | * | 10/2001 | ............ B26B 13/12 |
| JP | 2003276698 | A | | 10/2003 | |
| JP | 3706899 | B2 | | 10/2005 | |
| JP | 2006000347 | A | | 1/2006 | |
| JP | 2006006581 | A | | 1/2006 | |
| JP | 2006248456 | A | | 9/2006 | |
| JP | 2008014470 | A | | 1/2008 | |
| JP | 2008138558 | A | | 6/2008 | |
| JP | 2008154447 | A | | 7/2008 | |
| JP | 4273902 | B2 | | 6/2009 | |
| JP | 2009162233 | A | | 7/2009 | |
| JP | 2010117457 | A | | 5/2010 | |
| JP | 4576281 | B2 | | 11/2010 | |
| JP | 5760241 | | | 8/2015 | |
| JP | 2017175155 | A | | 9/2017 | |
| JP | 2018188035 | A | | 11/2018 | |
| JP | 2019094789 | A | | 6/2019 | |
| JP | 2019101988 | A | | 6/2019 | |
| JP | 2019-113578 | A | | 7/2019 | |
| JP | 2020090181 | A | | 6/2020 | |
| JP | 2021107221 | A | | 7/2021 | |
| KR | 19980044089 | U | | 9/1998 | |
| KR | 20050056526 | A | | 6/2005 | |
| KR | 1020130005989 | | | 1/2013 | |
| KR | 101395364 | B1 | | 5/2014 | |
| KR | 101483560 | B1 | | 1/2015 | |
| KR | 20170070675 | A | * | 6/2017 | ............ B26B 13/00 |
| KR | 101861620 | B1 | | 4/2018 | |
| KR | 1020180074003 | A | | 7/2018 | |
| KR | 101931791 | B1 | | 12/2018 | |
| KR | 20210052091 | A | | 5/2021 | |
| KR | 20210086518 | A | | 7/2021 | |
| KR | 102298464 | B1 | | 9/2021 | |
| WO | WO-9325267 | A1 | * | 12/1993 | ........ A61M 25/0158 |
| WO | 02011648 | A1 | | 2/2002 | |
| WO | 2005004321 | A1 | | 1/2005 | |
| WO | 2009079668 | A2 | | 6/2009 | |
| WO | 2009111362 | A2 | | 9/2009 | |
| WO | 2011017071 | A2 | | 2/2011 | |
| WO | 2011111769 | A1 | | 9/2011 | |
| WO | 2014145018 | A2 | | 9/2014 | |
| WO | 2014172320 | A1 | | 10/2014 | |
| WO | 2014191361 | A1 | | 12/2014 | |
| WO | 2015037600 | A1 | | 3/2015 | |
| WO | 2015051380 | A2 | | 4/2015 | |
| WO | 2016017057 | A1 | | 2/2016 | |
| WO | 2016130719 | A2 | | 8/2016 | |
| WO | 2017077541 | A1 | | 5/2017 | |
| WO | 2018080465 | A1 | | 5/2018 | |
| WO | 2018175741 | A1 | | 9/2018 | |
| WO | 2019043599 | A1 | | 3/2019 | |
| WO | 2019097437 | A1 | | 5/2019 | |
| WO | 2019137048 | A1 | | 7/2019 | |
| WO | 2019173227 | A1 | | 9/2019 | |
| WO | 2020110091 | A2 | | 6/2020 | |
| WO | 2020183360 | A1 | | 9/2020 | |
| WO | WO-2020244794 | A1 | * | 12/2020 | ............ B26B 15/00 |
| WO | 2021118185 | A2 | | 6/2021 | |
| WO | 2022258952 | A1 | | 12/2022 | |

OTHER PUBLICATIONS

Rowe et al., U.S. Appl. No. 18/329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,602, filed Aug. 21, 2023.
Rowe et al., U.S. Appl. No. 18/452,734, filed Aug. 21, 2023.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).
Edragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet:

(56) References Cited

OTHER PUBLICATIONS

<https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Rowe et al., U.S. Appl. No. 18/399,026, filed Dec. 28, 2023.
Zhu et al., U.S. Appl. No. 18/172,637, filed Feb. 22, 2023.
Rowe et al., U.S. Appl. No. 18/468,029, filed Sep. 15, 2023.
Pinkelman et al., U.S. Appl. No. 17/729,522, filed Apr. 26, 2022.
Ou et al., "jamSheets: Thin Interfaces with Tunable Stiffness Enabled by Layer Jamming," Proceedings of the 8th International Conference on Tangible, Embedded, and Embodied Interaction, 2014 (8 pages).
Ou et al., "aeroMorph—Heat-sealing Inflatable Shape-change Materials for Interaction Design," Proceedings of the 29th Annual Symposium on User Interface Software and Technology (2016) pp. 121-132 (10 pages).
Lee et al. "Long Shape Memory Alloy Tendon-based Soft Robotic Actuators and Implementation as a Soft Gripper" Scientific Reports, Aug. 2, 2019 (12 pages).
Saga et al. "Development of artificial muscle actuator reinforced by Kevlar fiber", 2002 IEEE International Conference on Industrial Technology, Jan. 2002 (5 pages).
Song et al., "Resistance Modelling of SMA Wire Actuators", Canadian Institute for NDE, International Workshop: Smart Materials, Structures & NDT in Aerospace Conference, Nov. 2011 (10 pages).
Motzki, "Efficient SMA Actuation-Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on. Apr. 5, 2020 by user "Andreas Spiess" accessible via the Internet: <https://www.youtube.com/watch?v=cG8moaufmQs>.
Barbarino et al., "A review on shape memory alloys with applications to morphing aircraft", Smart Materials and Structures, Apr. 2014 (19 pages).
"HapWRAP: Soft Growing Wearable Haptic Device", retrieved from the Internet: <https://smartdevicess.createdsites.com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag—Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: <https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).
El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).
Park et al., "A Novel Fabric Muscle Based on Shape Memory Alloy Springs", Soft Robotics, vol. 7, No. 3, 2020 (11 pages).
Ebay, "Cardboard Dividers 5 Sets 7.5" × 10.5" × 4" High 12 cell", retrieved from the Internet: <https://www.ebay.com itm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al., "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, pp. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).
alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, [Retrieved May 2, 2017] (3 pages).

(56) References Cited

OTHER PUBLICATIONS

Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 798100, Apr. 13, 2011 (8 pages).
Henry, "Dynamic Actuation Properties of Ni-Mn-Ga Ferromagnetic Shape Memory Alloys", submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/178,302, filed Mar. 3, 2023.
Wikipedia contributors. (Oct. 16, 2022). Swaged sleeve. In Wikipedia, The Free Encyclopedia. Retrieved 14:36, Aug. 14, 2025, from https://en.wikipedia.org/w/index.php?title=Swaged_sleeve&oldid=1116368722 (Year: 2022), (2 pages).

* cited by examiner

SHEARING TOOL WITH CLOSURE ASSIST

FIELD

The subject matter described herein relates in general to shearing tools and, more particularly, to the use of shearing tools.

BACKGROUND

Scissors are shearing tools that are operated by hand. Scissors typically includes a pair of handled blades pivotably connected to each other. When the handles of the scissors are closed, the sharp edges of the blade come together and slide past each other. Scissors can be used to cut various items.

SUMMARY

In one respect, the present disclosure is directed to a shearing tool. The shearing tool can include a first portion and a second portion pivotably connected to each other. The first portion can include a handle portion and a working portion. The second portion can include a handle portion and a working portion. The shearing tool can include a contracting member operatively connected to the first portion and the second portion. When activated, the contracting member can contract such that shearing tool moves from an open configuration toward a closed configuration. As a result, assistance in closing the shearing tool can be provided by the contracting member.

DETAILED DESCRIPTION

Figure 1:
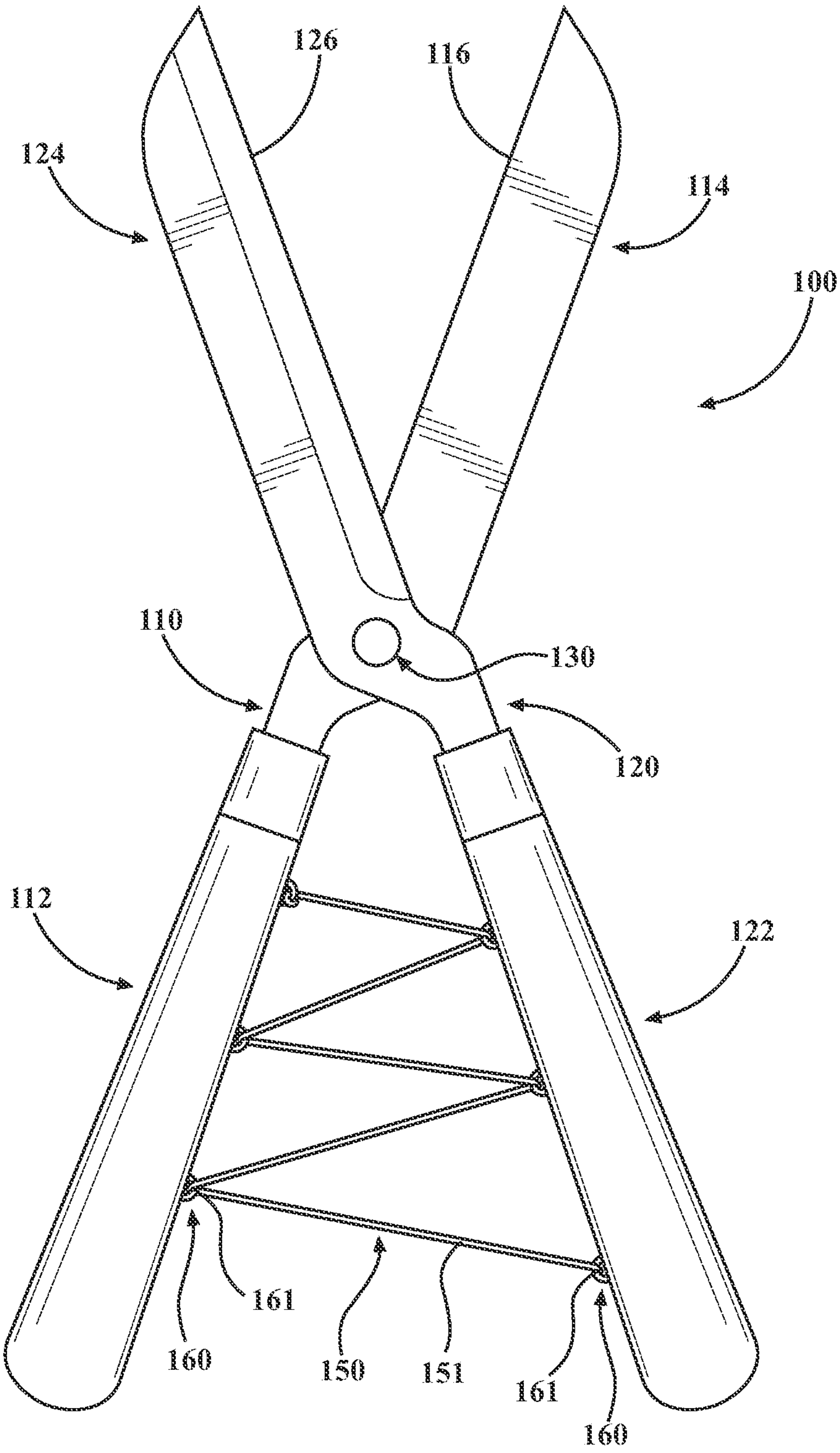
FIG. 1 is an example of shears, showing an open configuration

The ease of closing the scissors can be affected by various factors, such as the condition of the scissors, to the properties (e.g., thickness, material characteristics, etc.) of the material being cut, the strength of the user, and/or other factors. In some instances, it may be difficult for a user to effectively close the scissors. According to arrangements described herein, a shearing tool can be configured to assist a user in closing the shearing tool. Such arrangements can reduce or even eliminate force input by a user's hand to close the shearing tool.

The shearing tool can include a first portion and a second portion pivotably connected to each other. The shearing tool can include a contracting member operatively connected to the first portion and the second portion. When activated, the contracting member can contract such that shearing tool moves from an open configuration toward a closed configuration. As a result, assistance in closing the shearing tool can be provided by the contracting member.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
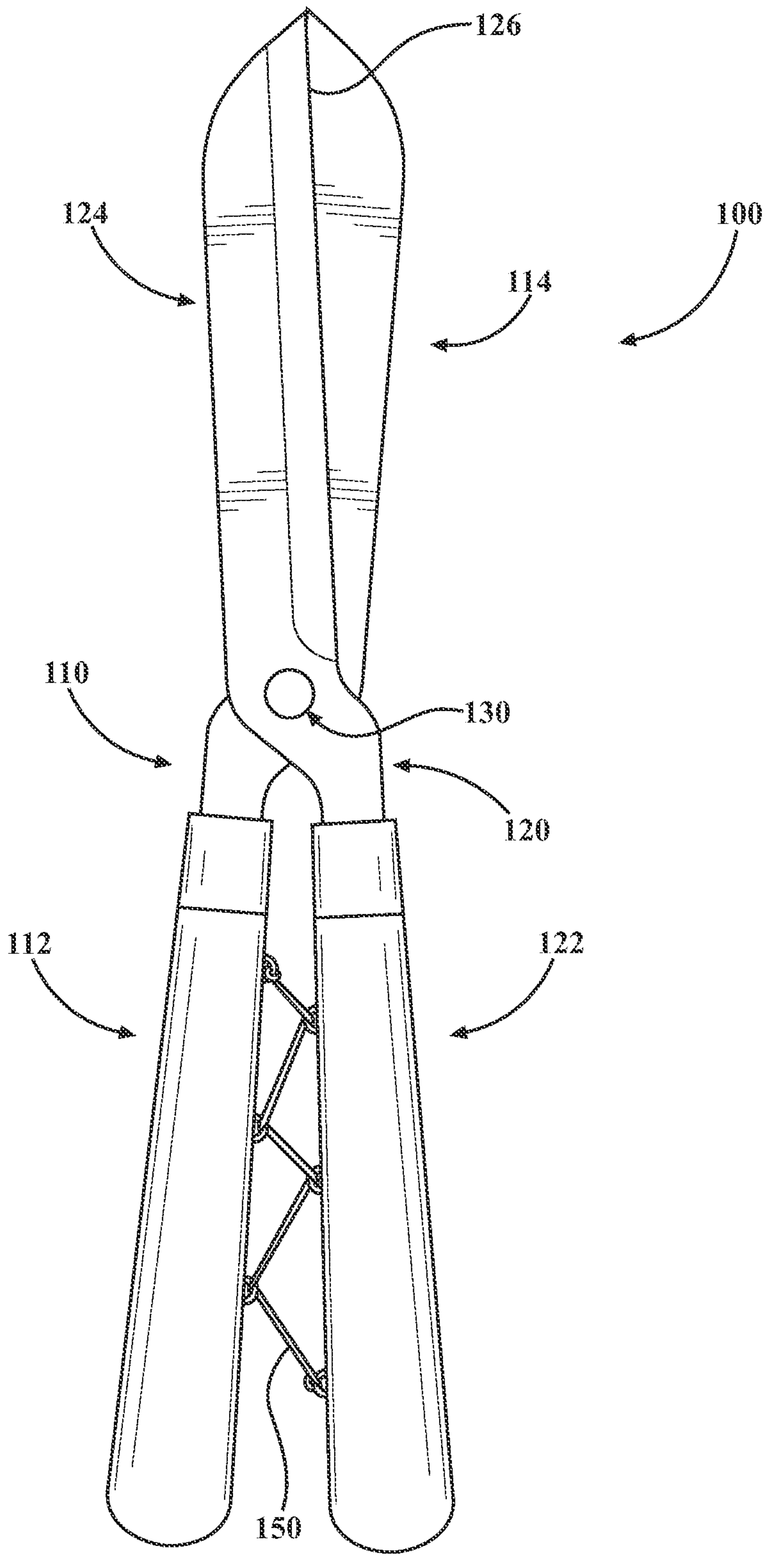
FIG. 2 is an example of the shears, showing a closed configuration.

Referring to FIGS. 1 and 2, an example of a shearing tool 100 is shown. The shearing tool 100 can be configured to have one or more open configurations (e.g., FIG. 1) and a closed configuration (e.g., FIG. 2).

The shearing tool 100 can be any type of shearing tool, now known or later developed. In some arrangements, the shearing tool 100 can be shears, scissors, kitchen shears, poultry shears, cigar cutters, garden shears, grass shears, hedge trimmers, pruning shears, loppers, hair-cutting shears, thinning shears, hair clippers, nail scissors, moustache scissors, nose scissors, snips, tin snips, compound action snips, throatless shears, pipe and duct snips, trauma shears, dissection scissors, surgical scissors, iris scissors, Metzenbaum scissors, tenotomy scissors, Mayo scissors, bandage scissors, and pipe cutters, crafting scissors, applique scissors, button hole scissors, dress-maker's scissors, embroidery scissors, pinking shears, and tailor's scissors, just to name a few possibilities. It will be appreciated that, in at least some arrangements, the shearing tool can be designed for a specialize purpose. The shearing tool 100 can be configured to be operated by hand.

The shearing tool 100 can include a first portion 110 and a second portion 120. The first portion 110 and the second portion 120 can be movably connected to each other. More particularly, the first portion 110 and the second portion 120 can be pivotably connected to each other. Any suitable form of pivotable connection, now known or later developed, can be used to connect the first portion and the second portion. For instance, the first portion 110 and the second portion 120 can be pivotably connected to each other by one or more fasteners 130, such as a pin, screw (e.g., a shoulder screw, etc.).

The first portion 110 can include a handle portion 112 and a working portion 114. The working portion 114 can include a blade 116. The second portion 120 can include a handle portion 122 and a working portion 124. The working portion 124 can include a blade 126.

In some arrangements, the first portion 110 and the second portion 120 can be substantially identical to each other. In other arrangements, the first portion 110 and the second portion 120 can be different from each other in one or more respects.

The first portion 110 and the second portion 120 can be configured such that their respective blades 116, 126 slide against each other when the handle portions 112, 122 are closed.

The first portion 110 and the second portion 120 can be made of any suitable material. In some arrangements, the first portion 110 and the second portion 120 can be made of metal, plastic, wood, other suitable material, or any combination thereof. In some arrangements, the handle portions

112, 122 can be made of the same material as the working portions 114, 124. However, in other arrangements, the handle portions 112, 122 can be made of a different material than the working portions 114, 124.

In some arrangements, the handle portions 112, 122 can be configured to include one or more ergonomic features to facilitate engagement by a user. Such ergonomic features can include soft materials, grips, contours, recesses, padding, foam, soft materials, flexible materials, gel materials, other ergonomic features to facilitate such engagement, or any combination thereof.

According to arrangements herein, the shearing tool 100 can include one or more contracting members 150. The contracting member(s) 150 can be any structure, element, member, or material that, when activated, is configured to shrink in length. In one or more arrangements, the contracting member(s) 150 can be one or more shape memory material members 151, such as shape memory alloy wires.

The contracting member(s) 150 can operatively connected to and extend between the first portion 110 and the second portion 120 of the shearing tool 100. When activated, the contracting member(s) 150 can contract, drawing the handle portions 112, 122 together and closing the working portions 114, 124 of the shearing tool 100.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 151 can be shape memory material wires. As an example, the shape memory material members 151 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 250 MPA to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 151 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature TSMA. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austentite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material member(s) 151 can, in some implementations, be wires, it will be understood that the shape memory material member(s) 151 are not limited to being wires. Indeed, it is envisioned that suitable shape memory material member(s) 151 may be employed in a variety of other forms, such as sheets, plates, panels, strips, cables, tubes, or combinations thereof.

In some arrangements, the contracting member(s) 150 can be configured to avoid direct contact with a user. To that end, the contracting member(s) 150 can include an insulating coating or an insulating sleeve. In this way, a user's body would not directly contact the contracting member(s) 150.

The contracting member(s) 150 can extend between the first portion 110 and the second portion 120 of the shearing tool 100 in any suitable manner. For instance, the contracting member(s) 150 can extend between the handle portion 112 and the handle portion 122 of the shearing tool 100.

The contracting member(s) 150 can be operatively connected to the handle portion 122 of the shearing tool 100. Any suitable manner of operative connection can be provided, such as one or more fasteners, one or more adhesives, one or more welds, one or more brazes, one or more forms of mechanical engagement, or any combination thereof. The contracting member(s) 150 can be directly or indirectly connected to the handle portion 112 and the handle portion 122.

In FIGS. 1-2, the contracting member(s) 150 are indirectly connected to the handle portion 112 and the handle portion 122 by a plurality of fasteners 160. The plurality of fasteners 160 can be operatively connected to the handle portion 112 and the handle portion 122 in any suitable manner. The fasteners 160 can be any suitable fasteners, including hooks, loops, eyelets 161, or rings. The contracting member(s) 150 can pass through the fasteners 160. In some arrangements, the fasteners 160 can be located on inward facing sides of the handle portion 112 and the handle portion 122.

In other examples, the contracting member(s) 150 can be operatively connected directly to the handle portion 112 and the handle portion 122. For example, the contracting member(s) 150 can be operatively connected to the handle portion 112 and the handle portion 122 by one or more screws, one or more nails, one or more adhesives, and/or one or more forms of mechanical engagement, or any combination thereof. As a result, the super elastic wire(s) 16 can directly contact the handle portion 112 and the handle portion 122. In some arrangements, the contracting member(s) 150 can wrap around the handle portion 112 and the handle portion 122. In some instances, the handle portion 112 and the handle portion 122 can include grooves or channels therein to route the contracting member(s) 150.

Of course, any combination of the above manners of operative connection can be implemented.

In some arrangements, there can be a single contracting member 150. In such case, the contracting member 150 can, for example, extend substantially linearly between the handle portion 112 and the handle portion 122. In another example, the contracting member 150 can extend non-linearly between the handle portion 112 and the handle portion 122. For instance, the contracting member 150 can extend in a zigzag, serpentine, or otherwise non-linear pattern between the handle portion 112 and the handle portion 122.

In some arrangements, there can be a plurality of contracting members 150. In such case, the contracting member 150 can be distributed, arranged, and/or oriented in any suitable manner. For instance, the contracting members 150 can extend substantially parallel to each other between the handle portion 112 and the handle portion 122. In other arrangements, one or more of the contracting members 150 can extend non-parallel to the other contracting members 150. In some instances, some of the plurality of contracting members 150 may cross over each other. In some arrangements, one or more of the plurality of contracting members 150 can extend substantially linearly between the handle portion 112 and the handle portion 122. In some arrangements, one or more of the plurality of contracting members 150 can extend non-linearly between the handle portion 112 and the handle portion 122. For instance, the contracting members 150 can extend in a zigzag, serpentine, or otherwise non-linear pattern between the handle portion 112 and the handle portion 122. In some arrangements, one or more of the plurality of contracting members 150 can extend in a different manner or pattern than the other contracting members 150.

Figure 3:
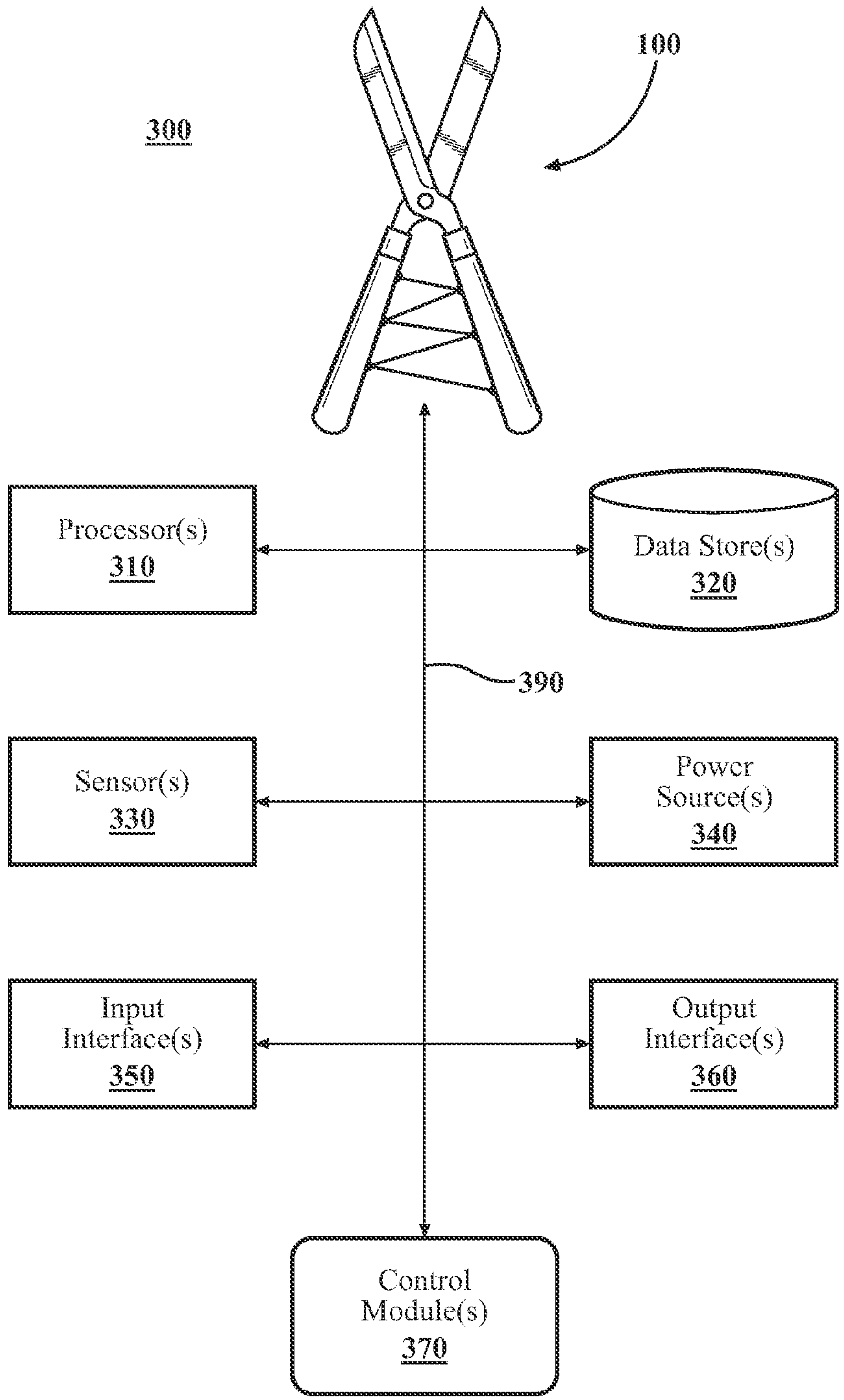
FIG. 3 is an example of a system.

FIG. 3 shows an example of a system 300. The system 300 can include various elements. Some of the possible elements of the system 300 are shown in FIG. 3 and will now be described. It will be understood that it is not necessary for the system 300 to have all of the elements shown in FIG. 3 or described herein. The system 300 can have any combination of the various elements shown in FIG. 3. Further, the system 300 can have additional elements to those shown in FIG. 3. In some arrangements, the system 300 may not include one or more of the elements shown in FIG. 3.

The system 300 can include the shearing tool 100 as described above. The shearing tool 100, or one or more portions thereof, can be operatively connected to one or more of the elements of the system 300.

The system 300 can include one or more processors 310, one or more data stores 320, one or more sensors 330, one or more power sources 340, one or more input interfaces 350, one or more output interfaces 360, and one or more control modules 370. Each of these elements will be described in turn below. While the various elements of the system 300 may be located on or within the shearing tool 100, it will be understood that one or more of these elements can be located remote from the shearing tool 100. Further, the elements shown may be physically separated by large distances.

As noted above, the system 300 can include one or more processors 310. "Processor" means any component or group of components that are configured to execute any of the processes described herein or any form of instructions to carry out such processes or cause such processes to be performed. The processor(s) 310 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 310 can include at least one hardware circuit (e.g., an integrated circuit) configured to carry out instructions contained in program code. In arrangements in which there is a plurality of processors 310, such processors can work independently from each other, or one or more processors can work in combination with each other.

The system 300 can include one or more data stores 320 for storing one or more types of data. The data store(s) 320 can include volatile and/or non-volatile memory. Examples of suitable data stores 320 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 can be a component of the processor(s) 310, or the data store(s) 320 can be operatively connected to the processor(s) 310 for use thereby. The term "operatively connected," as used throughout this description, can include direct or indirect connections, including connections without direct physical contact.

The system 300 can include one or more sensors 330. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 300 includes a plurality of sensors 330, the sensors can work independently from each other. Alternatively, two or more of the sensors can work in combination with each other. In such case, the two or more sensors can form a sensor network. The sensor(s) 330 can be operatively connected to the processor(s) 310, the data store(s) 320, and/or other elements of the system 300 (including any of the elements shown in FIG. 3).

The sensor(s) 330 can include any suitable sensor for detecting a closing of the shearing tool 100. Non-limiting examples of such sensors can include motion sensors (e.g., to detect a movement of the first portion 110 and/or the second portion 120 of the shearing tool 100), proximity sensors (e.g., to detect relative movement between portions of the shearing tool 100, such as the first portion 110 and the second portion 120), pressure sensors (e.g., to detect when a user grabs one or both of the handle portions 112, 122), force sensors (e.g., to detect a user applies a closing force to the shearing tool 100 and/or to detect when at least one of the blades 116, 126 of the shearing tool 100 exerts a force on another object), other suitable sensors, or any combination thereof.

As noted above, the system 300 can include one or more power sources 340. The power source(s) 340 can be operatively connected to supply energy to the contracting member(s) 150 of the shearing tool 100. The power source (s) 340 can be any power source capable of and/or configured to energize the contracting member(s) 150 of the shearing tool 100. For example, the power source(s) 340 can include one or more batteries, one or more fuel cells, one or more generators, one or more alternators, one or more solar cells, one or more heaters, one or more energy sources, and combinations thereof.

The system 300 can include one or more input interfaces 350. An "input interface" includes any device, component, system, element or arrangement or groups thereof that enable information/data to be entered into a machine. The input interface(s) 350 can receive an input from a user of the shearing tool 100. Any suitable input interface 350 can be used, including, for example, a keypad, display, touch screen, multi-touch screen, button, switch, joystick, mouse, trackball, microphone and/or combinations thereof. In some arrangements, the input interface(s) 350 can be located on the shearing tool 100. In other arrangements, the input interface(s) 350 can be located remotely from the shearing tool 100.

The system 300 can include one or more output interfaces 360. An "output interface" includes any device, component, system, element or arrangement or groups thereof that enable information/data to be presented to a user of the shearing tool 100. The output interface(s) 360 can present information/data to a chair occupant. The output interface(s) 360 can include a display, an earphone, and/or speaker. Some components of the system 300 may serve as both a component of the input interface(s) 350 and a component of the output interface(s) 360.

The system 300 can include one or more modules, at least some of which will be described herein. The modules can be implemented as computer readable program code that, when executed by a processor, implement one or more of the various processes described herein. One or more of the modules can be a component of the processor(s) 310, or one or more of the modules can be executed on and/or distributed among other processing systems to which the processor(s) 310 is operatively connected. The modules can include instructions (e.g., program logic) executable by one or more processor(s) 310. Alternatively or in addition, one or more data stores 320 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 300 can include one or more control modules 370. The control module(s) 370 can be configured to receive signals, data, information, and/or other inputs from one or more elements of the system 300. The control module(s) 370 can be configured to analyze these signals, data, information, and/or other inputs. The control module(s) 370 can be configured to select one or more of the contracting member(s) 150 to be activated or deactivated to achieve a desired effect. In some arrangements, the control module(s) 370 can be configured to select a predefined actuation profile from the data store(s) 320 to effectuate a desired actuation. Alternatively or additionally, the control module(s) 370 can be configured to detect user inputs (e.g., commands) provided on the input interface(s) 350. The control module(s) 370 can be configured to send control signals or commands over a communication network 390 to one or more elements of the system 300, including the shearing tool 100, the contracting member(s) 150, and/or any portion thereof.

The control module(s) 370 can be configured to cause the closure assist of the shearing tool 100 to be activated or deactivated by activating or deactivating the respective contracting member(s) 150 associated with the shearing tool 100. As used herein, "cause" or "causing" means to make, force, compel, direct, command, instruct, and/or enable an event or action to occur or at least be in a state where such event or action may occur, either in a direct or indirect manner. The control module(s) 370 can selectively provide an activation input to the shearing tool 100 or, more particularly, to the contracting member(s) 150 associated with the shearing tool 100. The control module(s) 370 can selectively permit or prevent the flow of electrical energy from the power source(s) 340.

The various elements of the system 300 can be communicatively linked to one another or one or more other elements through one or more communication networks 390. As used herein, the term "communicatively linked" can include direct or indirect connections through a communication channel, bus, pathway or another component or system. A "communication network" means one or more components designed to transmit and/or receive information from one source to another. The data store(s) 320 and/or one or more other elements of the system 300 can include and/or execute suitable communication software, which enables the various elements to communicate with each other through the communication network and perform the functions disclosed herein.

The one or more communication networks 390 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network 390 can include any combination of the above networks and/or other types of networks.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 4:
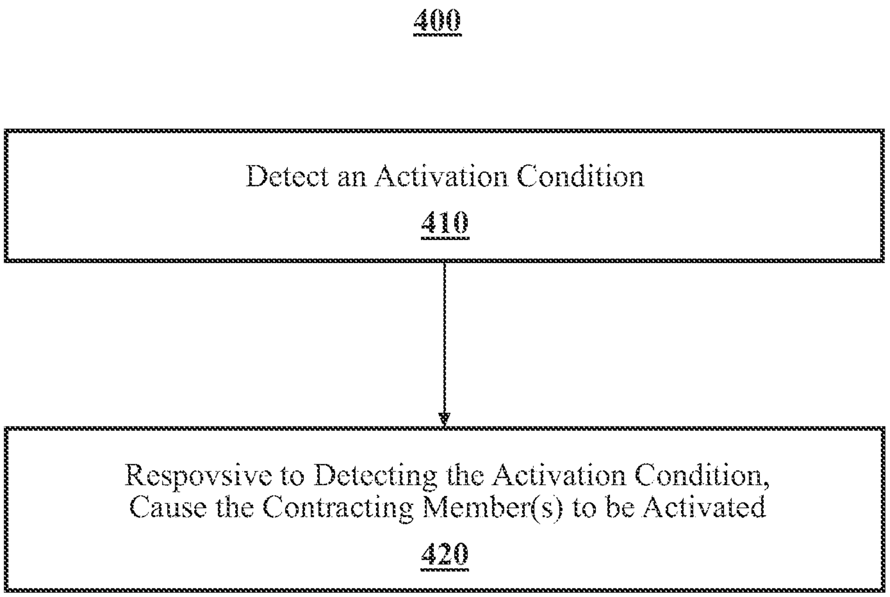
FIG. 4 is an example of a method.

Turning to FIG. 4, an example of a method 400 is shown. At block 410, an activation condition can be detected. Such detection can be performed by the processor(s) 310, the sensor(s) 330, and/or the control module(s) 370. In some arrangements, the activation condition can be the closing of the shearing tool 100. In such cases, the detection of the activation condition can be based on sensor data acquired by the sensor(s) 330. In one or more arrangements, the activation condition can be a user command. In such cases, the activation condition can be based on a user input provided on the input interface(s) 350. If an activation condition is not detected, then no action may be taken. If an activation condition is detected, the method can continue to block 420.

At block 420, responsive to detecting the activation condition, the contracting member(s) 150 can be caused to be activated. The activation of the contracting member(s) 150 can cause the shearing tool 100 to close or to assist the closing of the shearing tool 100 to close. Causing the activation of the contracting member(s) 150 can be performed by the processor(s) 310 and/or the control module(s) 370. For instance, the processor(s) 310 and/or the control module(s) 370 can cause or allow the flow of energy from the power sources(s) 340 to the contracting member(s) 150. In a particular example, the processor(s) 310 and/or the control module(s) 370 can cause or allow the flow of electrical energy from the power sources(s) 340 to the contracting member(s) 150 or the shape memory material member(s) 151 of the shearing tool 100. As a result, the contracting member(s) 150 can contract, thereby causing the handle portions 112, 122 of the first portion 110 and the second portion 120 to be drawn toward each other. In some arrangements, the contraction of the contracting member(s) 150 can be sufficient to cause the shearing tool 100 to close. In some arrangements, the contraction of the contracting member(s) 150 can supplement the closing force applied to the shearing tool 100 by a user's hand(s).

In some arrangements, the causing in block 420 can occur in response to a user input. For example, the processor(s) 310 and/or the control module(s) 370 can be configured to detect user inputs (e.g., commands) provided on the input interface(s) 350. In response, the processor(s) 310 and/or the control module(s) 370 can be configured to cause or allow the flow of energy from the power sources(s) 340 to the contracting member(s) 150. In a particular example, the processor(s) 310 and/or the control module(s) 370 can cause or allow the flow of electrical energy from the power sources(s) 340 to the contracting member(s) 150 or the shape memory material member(s) 151 of the shearing tool 100.

After the shearing tool is closed or at any other suitable time (e.g., a user command or a when the first portion 110 and/or the second portion 120 is no longer moving), the activation input to the contracting member(s) 150 can be discontinued. The contracting member(s) 150 can cool. As a result, the contracting member(s) 150 can become relaxed and the overall length of the contracting member(s) 150 can increase.

The method 400 can end. Alternatively, the method 400 can return to block 410 or to some other block. The method 400 can be repeated at any suitable point, such as at a suitable time or upon the occurrence of any suitable event or condition.

It will be appreciated that arrangements described herein can provide numerous benefits, including one or more of the benefits mentioned herein. For example, arrangements described herein can reduce or even eliminate the force exerted by a user's hand(s) to close a shearing tool. Arrangements described herein can enhance user interaction with a shearing tool. Arrangements described here can improve the performance of a shearing tool.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A shearing tool comprising:

a first portion including a handle portion and a working portion;

a second portion including a handle portion and a working portion, the first portion and the second portion being pivotably connected to each other; and a shape memory material member operatively connected to the first portion and the second portion, when activated, the shape memory material member contracts such that shearing tool moves from an open configuration toward a closed configuration, whereby closure assistance is provided by the shape memory material member.

2. The shearing tool of claim 1, wherein the shape memory material member is a shape memory alloy wire.

3. The shearing tool of claim 1, wherein the shape memory material member is operatively connected to the handle portion of the first portion and the handle portion of the second portion.

4. The shearing tool of claim 3, wherein the shape memory material member extends in a non-linear pattern between the handle portion of the first portion and the handle portion of the second portion.

5. The shearing tool of claim 1, further including:

a power source operatively connected to supply energy to the shape memory material member; and one or more processors operatively connected to the power source, wherein the one or more processors are configured to selectively control a supply of energy to the shape memory material member.

6. The shearing tool of claim 5, further including a sensor, wherein the sensor is operatively connected to the one or more processors, and wherein the sensor is configured to acquire sensor data about the shearing tool.

7. The shearing tool of claim 6, wherein the one or more processors are configured to:

detect an activation condition; and responsive to detecting the activation condition, cause the shape memory material member to be activated.

8. The shearing tool of claim 5, further including an input interface configured to receive a user input, wherein the input interface is operatively connected to the one or more processors, and wherein the one or more processors are configured to:

responsive to receiving a user input on the input interface, cause the shape memory material member to be activated.

9. The shearing tool of claim 1, wherein at least a portion of the shape memory material member is insulated.

* * * * *